United States Patent
Hong et al.

(10) Patent No.: US 9,846,926 B2
(45) Date of Patent: Dec. 19, 2017

(54) HIGH QUALITY EMBEDDED GRAPHICS FOR REMOTE VISUALIZATION

(71) Applicant: Siemens Healthcare GmbH, Erlangen (DE)

(72) Inventors: Wei Hong, Edison, NJ (US); John Paulus, East Windsor, NJ (US); Feng Qiu, Pennington, NJ (US); Daphne Yu, Yardley, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 204 days.

(21) Appl. No.: 14/734,003

(22) Filed: Jun. 9, 2015

(65) Prior Publication Data
US 2016/0364902 A1    Dec. 15, 2016

Related U.S. Application Data

(60) Provisional application No. 62/010,712, filed on Jun. 11, 2014.

(51) Int. Cl.
| | |
|---|---|
| G06T 1/20 | (2006.01) |
| G06T 5/50 | (2006.01) |
| G06T 19/00 | (2011.01) |
| G06T 9/00 | (2006.01) |
| G06T 15/00 | (2011.01) |

(52) U.S. Cl.
CPC ........... *G06T 5/50* (2013.01); *G06T 19/00* (2013.01); *G06T 9/00* (2013.01); *G06T 15/00* (2013.01); *G06T 2207/10028* (2013.01); *G06T 2210/41* (2013.01); *G06T 2219/004* (2013.01)

(58) Field of Classification Search
CPC ..... G06T 2219/004; G06T 15/00; G06T 8/50; G06T 9/00; G06T 2207/10028; G06T 19/00; G06T 2210/41
See application file for complete search history.

(56) References Cited

U.S. PATENT DOCUMENTS

| | | | |
|---|---|---|---|
| 7,808,514 B2 | 10/2010 | Yu et al. | |
| 8,063,901 B2 * | 11/2011 | Paladini | G06T 15/08 345/424 |

(Continued)

OTHER PUBLICATIONS

Kalkoften et al. Interactive Focus and Context Visualization for Augmented Reality, published Dec. 2007, IEEE, 1-10.*

(Continued)

*Primary Examiner* — Robert Craddock

(57) ABSTRACT

Apparatuses and methods for rendering and compositing two-dimensional images for remote visualization using a multi-pass rendering technique are provided. A server computer renders a three-dimensional volume separately from one or more three-dimensional graphical objects to be embedded in the rendered image of the volume. The server compresses and transmits the separately rendered images to a client computer. The client computer decompresses the rendered images and generates a composite image using the rendered images. If a user manipulates, adds or deletes an embedded object, the client computer generates a new composite image using the previously rendered volume image. In the case of a new or manipulated embedded graphical object, the server only renders the manipulated or new object.

20 Claims, 3 Drawing Sheets

(56) References Cited

U.S. PATENT DOCUMENTS

2006/0203010 A1\* 9/2006 Kirchner ............... G09G 3/003
345/629
2014/0354629 A1\* 12/2014 Adlers ..................... G06T 3/60
345/419

OTHER PUBLICATIONS

Heidelberger et al. Real-Time Volumetric Intersections of Deforming Objects, published Nov. 21, 2003, VMV, 1-8.\*

\* cited by examiner

HIGH QUALITY EMBEDDED GRAPHICS FOR REMOTE VISUALIZATION

CROSS-REFERENCE TO RELATED APPLICATIONS

The present patent document claims the benefit of U.S. Patent Application No. 62/010,712, filed on Jun. 11, 2014, which is hereby incorporated by reference.

BACKGROUND

In many three-dimensional (3D) volume visualization applications, such as computerized tomography (CT) or magnetic resonance (MR) scanning, it is common to embed graphical objects within a 3D volume rendering to provide display points, line graphics, or opaque object surfaces at their true 3D locations within the 3D volume rendering. The embedded graphical objects are often manipulated using a mouse or other user interface. It is challenging to meet the speed and performance requirements to manipulate the embedded graphical objects within a 3D volume because the 3D volume and the graphical objects are completely re-rendered in order to generate a composite image with the correct depth embedding. This challenge is common in many advanced visualization application systems and is particularly limiting when the visualization application is accessed from a remote client computer, adding data transfer latency between the application client and the application server.

Many existing remote visualization applications workaround this challenge by providing only a two-dimensional (2D) overlay visualization graphics over a 3D volume rendering. Providing the 2D overlays prevents the visualization from providing accurate depth perception. Another workaround renders lower resolution 3D embedded graphics in order to speed up performance of the visualization application, compromising the image quality of the graphics. Alternatively, high performance computing application systems and high speed networks may compensate for the latency, but the systems and networks are not cost effective and may not be available. Thus, these workarounds fail to provide a high quality 3D visualization in a cost effective manner.

SUMMARY

The present embodiments relate to high quality remote visualization of embedded graphics. By way of introduction, the present embodiments described below include apparatuses and methods for rendering and compositing resulting two-dimensional images for remote visualization using a multi-pass rendering technique. A server computer separately renders one or more three-dimensional volumes and one or more three-dimensional graphical objects. The server computer compresses and transmits the separately rendered images to a client computer. The client computer decompresses the rendered images and generates a composite image using the decompressed images. If a user manipulates, adds or deletes an object, the client computer re-generates the composite image using the previously rendered volume image. In the case of a new or manipulated embedded graphical object, the server only renders and transmits the manipulated or new object to the client for compositing.

In a first aspect, a method for rendering embedded graphics for remote visualization is provided. A server renders a two-dimensional volume rendered image from three-dimensional data captured for a volume and renders a two-dimensional graphic rendered image to be embedded in the two-dimensional volume rendered image from three-dimensional data for a graphic. The server compresses the volume rendered image and the graphic rendered image and transmits the compressed volume rendered image and the compressed graphic rendered image to a workstation over a network.

In a second aspect, a system for rendering embedded graphics for remote visualization is provided. A server is configured to render a two-dimensional volume rendered image from three-dimensional data captured for a volume and to render a two-dimensional graphic rendered image to be embedded in the two-dimensional volume rendered image from three-dimensional data for a graphic. The server is also configured to compress the volume rendered image and the graphic rendered image and to transmit the compressed volume rendered image and compressed the graphic rendered image over a network. A workstation is configured to receive the compressed volume rendered image and the compressed graphic rendered image over the network and to decompress the compressed volume rendered image and the compressed graphic rendered image. The workstation is also configured to generate a composite rendered image from the volume rendered image and the graphic rendered image and to display the composite rendered image.

In a third aspect, a method for rendering high quality embedded graphics for remote is provided. A patient is scanned to capture three-dimensional volume data representing the patient. A two-dimensional volume rendered image is rendered from the three-dimensional volume data representing the patient and a plurality of two-dimensional graphic rendered images to be embedded in the two-dimensional volume rendered image are rendered from three-dimensional data for a plurality of graphics. The graphics include a display point, a line graphic, an opaque object or a combination thereof. A composite rendered image is generated from the volume rendered image and the plurality of graphic rendered images and the composite rendered image is displayed.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

DETAILED DESCRIPTION OF EXEMPLARY EMBODIMENTS

This present embodiments provide a multi-pass rendering technique to preserve high quality embedded graphics in a volume rendering. The multi-pass rendering technique allows for real-time interaction when the graphical objects are manipulated within an application system. The multi-pass rendering technique also leverages the client side device of the application system to perform all or part of the compositing steps without loss of depth perception in the composite image generated and displayed. According to one embodiment, the multi-pass rendering technique is used to display full, high quality embedded graphics accurately in a volume rendering. The multi-pass rendering technique is not limited to client-server applications, and can be used in standalone applications to improve the performance of the generation and manipulation of the embedded graphics.

The multi-pass rendering technique may improve remote visualization of embedded graphics by rendering a volume image and one or more graphics images separately on a server, and compositing the rendered images on a client computer. The proposed embodiments may provide for full, high quality (e.g., available quality or resolution of the voxels from a patient scan) embedded graphics to be displayed on the client computer. The proposed embodiments may also provide for efficient graphics manipulation, including fast deletion or modification of graphics without the need to re-render the volume image on the server computer. Upon deletion or modification of a graphic, the client computer only re-generates and displays the rendered volume image or a new composite image. As a result of the present embodiments, better performance may be achieved.

Figure 1:
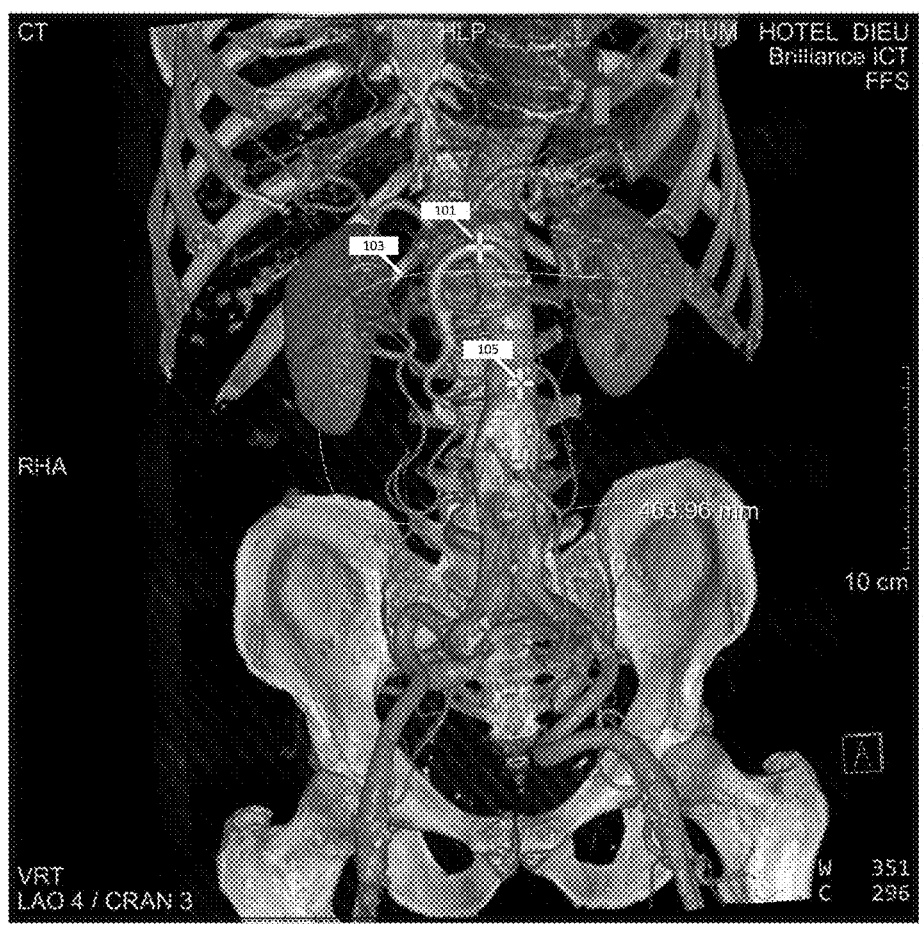
FIG. 1 illustrates an example of high quality embedded graphics for remote visualization.

FIG. 1 illustrates an example of high quality embedded graphics for remote visualization. FIG. 1 depicts a composite image generated from a volume rendering and three embedded graphical objects. The composite image is captured by a three-dimensional (3D) scanning application, such as a computerized tomography (CT) or magnetic resonance (MR) scanning application. The rendered volume depicted in FIG. 1 is an image of a patient's torso. Other volumes may be depicted, such as another area of a patient's body, or another object. The three embedded graphical objects include a polyline 103 and two markers 101 and 105. For example, the polyline 103 is used to take measurements in the volume, such as the size of a tumor or the size of organs and other tissue. As shown in FIG. 1, the length of the polyline 103 is provided (e.g., 463.96 mm) as part of the graphic. The embedded graphical objects 101 and 103 are display points. The display points provide 3D markers in the volume, such as used to identify objects or areas within the volume. Additional, different, or fewer embedded graphical objects may be provided. For example, opaque object surfaces may be provided, such as a mesh model of a surface extracted from the volume to show blood vessels in the volume. As another example, a target or other shape point marker is used. The embedded graphical objects may be manipulated using a mouse or other user interface.

Figure 2:
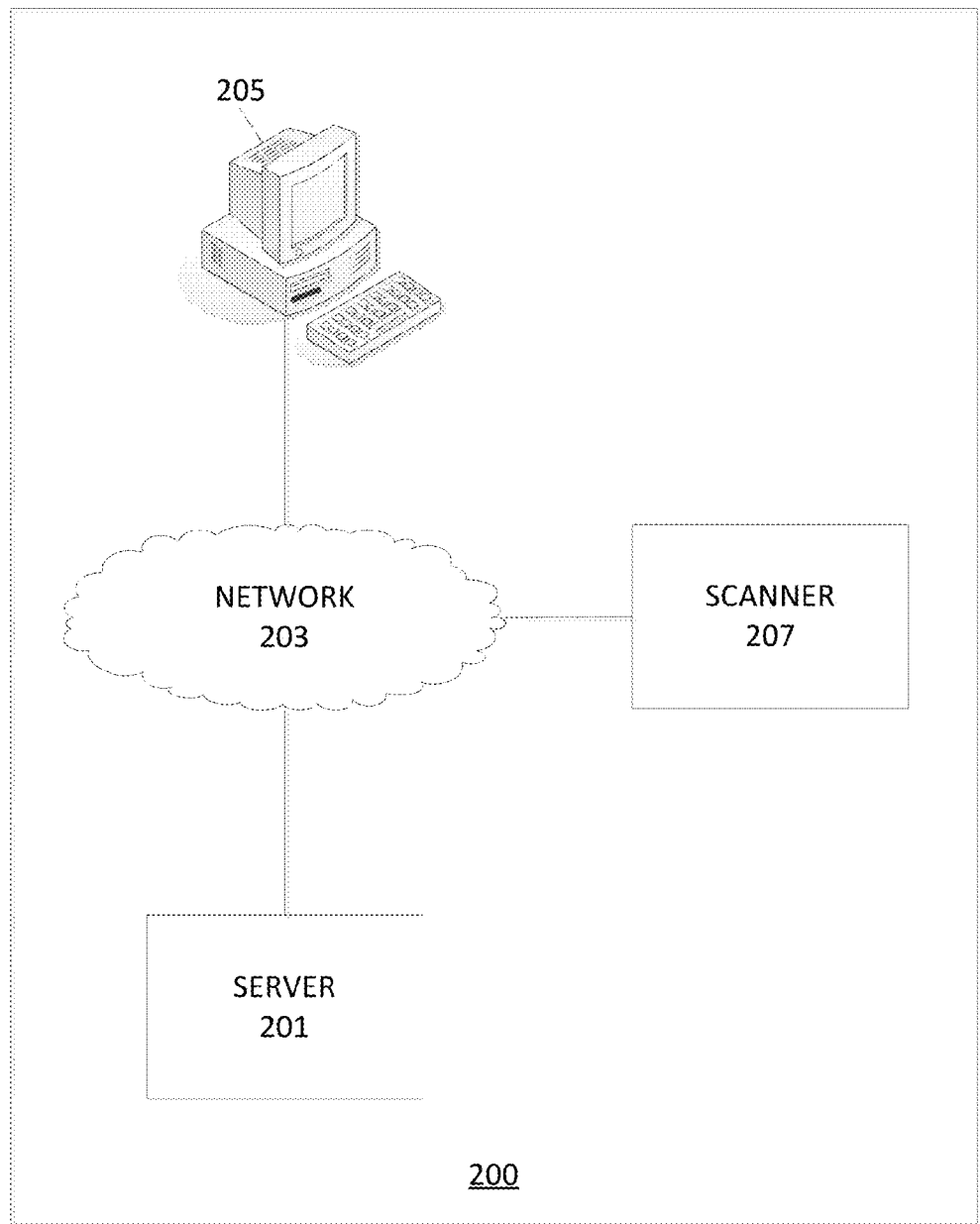
FIG. 2 illustrates an embodiment of a system for high quality embedded graphics for remote visualization.

FIG. 2 illustrates an embodiment of a system for high quality embedded graphics for remote visualization. The system 200 includes a server computer 201, a network 203, a client computer 205 and a scanner 207. Additional, different, or fewer components may be provided. For example, additional server computers 201, networks 203, client computers 205 and/or scanners 207 are used. In another example, the server computer 201 and the client computer 205 are directly connected, or implemented on a single computing device. In yet another example, server computer 201, client computer 205 and scanner 207 are implemented on a single scanning device. As another example, the client computer 205 is part of the scanner 207.

The server 201 is a server computer platform having hardware such as one or more central processing units (CPU), a system memory, a random access memory (RAM) and input/output (I/O) interface(s). The server 201 also includes a graphics processor unit (GPU) to accelerate image rendering. The server 201 is implemented on one or more server computers connected to network 203. Additional, different or fewer components may be provided.

The server 201 is configured to execute an application to render two-dimensional (2D) rendered images from three-dimensional (3D) image data. For example, the server 201 executes the application to render a 2D volume rendered image from 3D data captured by the scanner 207. In alternative embodiments, a memory separate from the scanner provides the 3D data or volume to the server 201. Further, the server 201 executes the application to render a 2D graphic rendered image from 3D data for one or more graphics to be embedded in the 2D volume rendered image. The 3D data from the graphic is generated by the application, by an application executed by client computer 205, and/or by scanner 207.

The server 201 is configured to execute an application to render the 2D volume rendered image and the 2D graphic rendered image separately, according to a multi-pass methodology. According to the multi-pass methodology, the 2D volume rendered image is rendered in a first pass, then one or more 2D graphic rendered images are rendered in subsequent passes. Alternatively, the 2D volume rendered image and the 2D graphic rendered images are rendered separately and concurrently in parallel processes. Any rendering may be used, such as projection or surface rendering.

The server 201 is further configured to execute an application to compress the volume rendered image and the graphic rendered image. The rendered images are compressed using JPEG or other lossy or lossless compression. The server 201 transmits the compressed volume rendered image and compressed the graphic rendered image to the client computer 205 via the network 203. In other embodiments, one or more of the images are not compressed, but instead transmitted without compression.

The system 200 includes a client computer 205, such as a user workstation. The client computer 205 is a client computer platform having hardware, such as one or more central processing units (CPU), a system memory, a random access memory (RAM) and input/output (I/O) interface(s). The client computer 205 is implemented on one or more computers connected to network 203, such as a tablet, personal computer, laptop, desktop, or other computer. Additional, different or fewer components may be provided, such as a graphics processing unit.

The client computer 205 is configured to execute an application configured to receive and to decompress the compressed volume rendered image and the compressed graphic rendered image from the server 201 over the network 203. Further, the client computer 205 executes the application to generate and display a composite rendered image from the volume rendered image and the graphic rendered image. For example, the client computer 205 executes the application to replace pixels in the volume rendered image with pixels from graphic rendered image, embedding the graphic object image in the volume image resulting in a composite image. Only the pixels representing a graphic object are replaced. The composite image is displayed. An overlay process with partially transparent graphic image may be used to embed the graphic object image in the volume image.

The system 200 includes a scanner 207. The scanner 207 is a three-dimensional scanner, such as a computerized tomography (CT) or magnetic resonance (MR) scanner. Other three-dimensional scanners may be used. The scanner 207 captures three-dimensional data for the volume and/or generates the embedded graphic used to render one or more two-dimensional images.

The system 200 includes a network 203. The network 203 is a wired or wireless network, or a combination thereof. Network 203 is configured as a local area network (LAN), wide area network (WAN), intranet, Internet or other now known or later developed network configurations. Any network or combination of networks for communicating between the client computer 205, the scanner 207 and the server 201 may be used.

Figure 3:
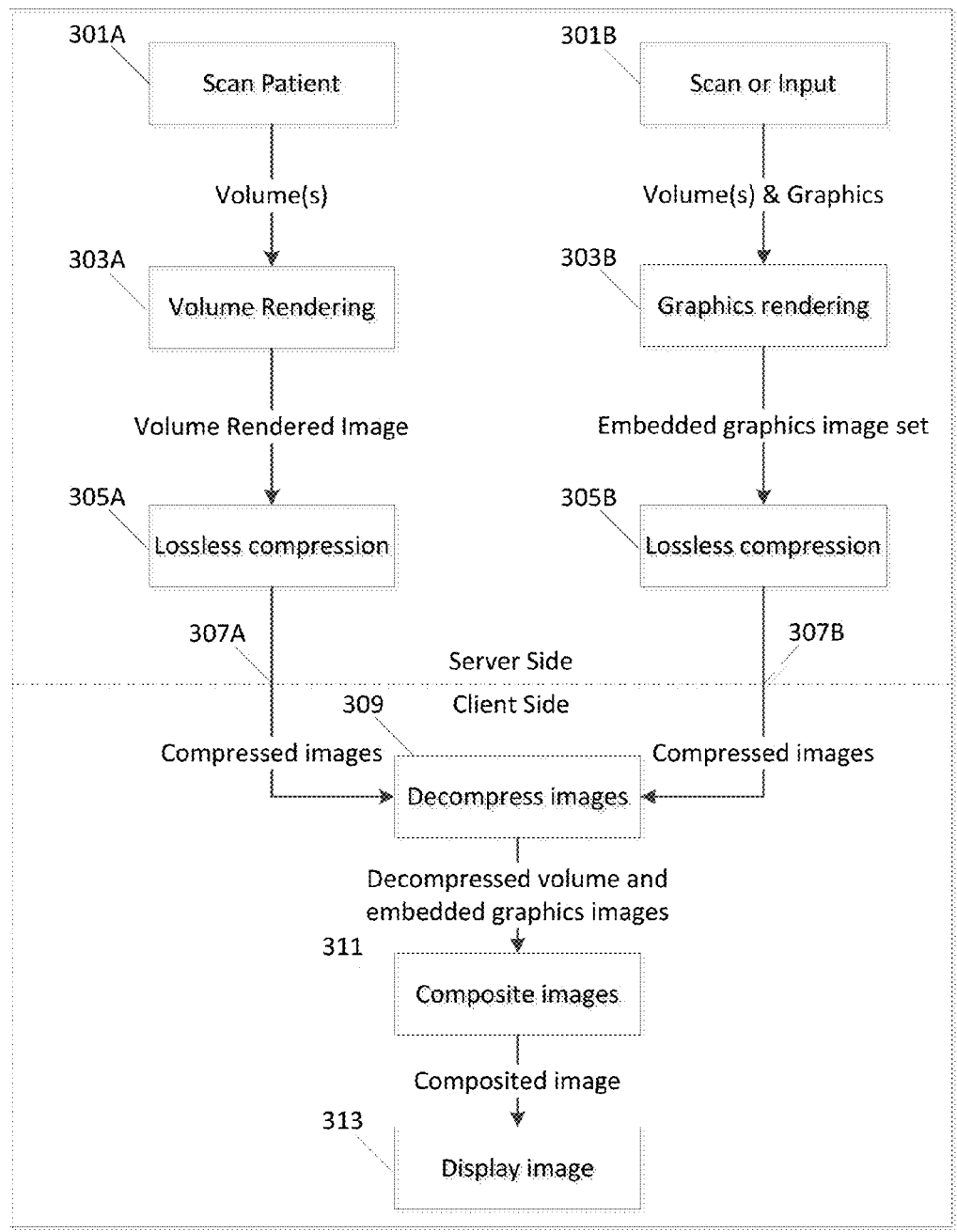
FIG. 3 illustrates a flowchart diagram of an embodiment of a method for high quality embedded graphics for remote visualization.

FIG. 3 illustrates a flowchart diagram of an embodiment of a method for generating high quality embedded graphics for remote visualization. The method is implemented by the system of FIG. 2 and/or a different system. Additional, different or fewer acts may be provided. The method is provided in the order shown. Other orders may be provided and acts may be repeated. Further, the acts may be performed concurrently as parallel acts.

At act 301A, a patient or other object is scanned to capture three-dimensional volume data representing the patient or other object. At act 301B, one or more graphics are input by a user or generated by a processor. For example, the processor of the scanner 207 generates the spline graphic shown in FIG. 1, and a user inputs the point selections. The graphics are distributed in 3D space.

At act 303A, a two-dimensional volume image is rendered from the three-dimensional data captured for the patient or other object. Any rendering may be used, such as projection or surface. Other rendering processes may be applied, such as adding lighting effects. The three-dimensional volume rendering outputs a two-dimensional volume image, such as a graphics hardware frame buffer object (FBO). For example, the processor of server 201 renders a 2D image from the spline graphic generated by the processor of the scanner 207. For example, using FBO(s), each image has a set of two-dimensional image data including a color image of the two-dimensional rendering results, a depth buffer and a stencil buffer.

At act 303B, a two-dimensional graphic image is rendered from three-dimensional data for a graphic and/or object to be embedded in the two-dimensional volume rendered image. One or more graphics and/or objects are rendered. For example, one or more graphics are rendered separately. Alternatively, one or more graphics are rendered together, or the graphics are rendered in one or more sets of graphic images. Only one set of graphic image data is required (e.g., with only one graphic image), but the application may utilize more than one set of graphic image data, with each graphic image having a separate set of image data. In an example, several objects are rendered separately. By separating the graphic objects, performance associated with manipulating the various graphic objects may improve by reducing the size of the graphic object needing to be re-composited with the rendered volume image upon manipulation (e.g., reducing the non-empty image region in the rendered graphic image). For example, referring to FIG. 1, if each of the objects 101, 103 and 105 are rendered separately, manipulating one of the three objects (101, 103 or 105) only requires re-rendering the manipulated object.

The same or different type of rendering is used for the graphics as is used for the scan volume. For example, the scan volume is rendered using alpha blending or maximum intensity projection after segmentation. The graphics are rendered using the same projection rendering or a surface rendering. For example, the processor of server 201 renders one or more 2D images in the same manner as the 2D image rendered from the spline graphic.

The three-dimensional rendering outputs two-dimensional images, such as FBO(s), with the same image size and resolution for the rendered volume image and the rendered graphics images. For example, using frame buffer objects FBO(s), each image has a set of two-dimensional image data including a color image of the two-dimensional rendering results, a depth buffer and a stencil buffer. The color image includes pixel color information of the two-dimensional rendered image. The depth buffer provides a relative distance for each pixel of the image (e.g., the distance from the scanner or camera to the pixel). The stencil buffer is used to identify which pixels of the rendered graphic image intersect with pixels of the volume rendered image. In an example, the stencil buffer is used to identify so-called empty and non-empty pixels of a rendered graphic image. For example, non-empty pixels are pixels of the rendered graphic image that intersect with pixels of the rendered volume image (e.g., same location in the two-dimensional rendered area). Empty pixels are pixels of the rendered graphic image that do not intersect with pixels of the volume rendered image. By employing empty and non-empty pixels, the color image of the rendered graphic image will only contain pixels that cover, or are covered, by the rendered volume image.

At acts 305A and 305B, the rendered volume and the graphic images are compressed. For example, lossless compression is used to compress the rendered volume image and the graphic image(s) for transmission. In this example, various lossless compression techniques may be employed, such as, sparse index and color array or run-length encoding. Other lossless compression techniques are contemplated, such as encoding using a JPEG format. For example, the processor of server 201 compresses the rendered volume image and one or more graphic images.

At acts 307A and 307B, the compressed volume rendered image and the compressed graphic rendered image(s) are transmitted to the client computer over the network. For example, a volume rendered image and one or more graphic color images are transmitted by the server 201 to the client computer 205 via a network 203. The compressed volume rendered image and one or more compressed the graphic rendered images are received by the client. In the client-server implementation, the compressed volume rendered and one or more graphic color images are received by the client computer 205 from the server 201 via the network 203.

At act 309, the compressed volume rendered image and one or more compressed graphic rendered images are decompressed. For example, in a remote client in a client-server implementation, the compressed volume rendered and one or more graphic color images are decoded on the client side by the processor of the client computer 205.

At act 311, a composite rendered image is generated from the volume rendered image and one or more graphic rendered images. For example, the processor of client computer 205 generates the composite rendered image. The volume rendered image and one or more graphic color images are composited or blended together by replacing pixels in the volume rendered image with the non-empty pixels from one or more graphics color images. By compositing the images together, one or more graphic rendered images are embedded into the volume rendered image. For example, each non-empty pixel from a graphic rendered image replaces each corresponding pixel of the volume rendered image. Alternatively, the depth buffer entry for each non-empty pixel from a graphic rendered image is compared with the depth buffer entry for each corresponding pixel for the volume rendered image. In this example, only pixels of the volume rendered image with smaller depth buffer values are replaced by non-empty pixels from the graphic rendered image. As such, if a pixel of the volume rendered image has a greater three-dimensional depth than a pixel of the graphic rendered image, the pixel is covered by the pixel of the graphic image and will be replaced in the composite image. In alternative embodiments, the depth buffer controls the level of transparency. Closer objects are rendered more opaque than further objects, but with transparency allowing viewing of the further objects (e.g., allowing a graphic behind an organ of the volume rendered image to be viewed).

At act 311, the composite rendered image is displayed. For example, a display of client computer 205 displays the composite rendered image. Optionally, the compressed or decompressed volume rendered image and/or graphic rendered image(s) are maintained on the client computer such that unmodified images do not need to be re-rendered, re-compressed and/or re-transmitted by the server. For example, after displaying the composite image, a user may manipulate one or more of the embedded graphics images. In this example, the user requests that one or more of the embedded graphics images be deleted, such as deleting the spline of FIG. 1. The client re-generates a composite rendered image from the volume rendered image and the remaining or none of the graphic rendered images. If all of the embedded graphics images are deleted, the volume rendered image is displayed without added graphics. Alternatively, the user requests an additional embedded image. In this example, the server renders, compresses and transmits the additional graphic rendered image to the client. The client re-generates a composite rendered image from the composite image and the additional graphic rendered image. As such, the disclosed embodiments allow for real-time interaction where the graphic objects can be manipulated within an application system.

Various improvements described herein may be used together or separately. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

We claim:

1. A method for rendering embedded graphics for remote visualization, the method comprising:
   rendering, by a server, a two-dimensional volume rendered image from three-dimensional data captured for a volume;
   rendering, by the server, a two-dimensional graphic rendered image to be embedded in the two-dimensional volume rendered image from three-dimensional data for a graphical object, the two-dimensional graphic rendered image only containing volume rendered pixels covered in the two-dimensional volume rendered image by the graphical object;
   compressing, by the server, the volume rendered image and the graphic rendered image; and
   transmitting, to a workstation over a network, the compressed volume rendered image and the compressed graphic rendered image.

2. The method of claim 1 further comprising:
   receiving, by the workstation, the compressed volume rendered image and the compressed graphic rendered image; decompressing, by the workstation, the compressed volume rendered image and the compressed graphic rendered image;
   generating, by the workstation, a composite rendered image from the volume rendered image and the graphic rendered image; and
   displaying, by the workstation, the composite rendered image.

3. The method of claim 2 further comprising:
   receiving, by the workstation, a request to delete the graphic rendered image; and
   displaying, by the workstation in response to receiving the request, the volume rendered image without the graphic rendered image.

4. The method of claim 1 wherein the volume rendered image and the graphic rendered image comprise graphics hardware frame buffer objects.

5. The method of claim 4 wherein the graphics hardware frame buffer objects for the graphic rendered image comprise an image set, the image set comprising:
   color pixel information of the graphic rendered image;
   a depth buffer comprising relative distance information for each pixel of the graphic rendered image; and
   a stencil buffer comprising identification of which pixels of the graphic rendered image intersect with pixels of the volume rendered image.

6. The method of claim 5 wherein rendering the graphic rendered image comprises:
   rendering, based on the stencil buffer, non-empty pixels for pixels that intersect with pixels of the volume rendered image; and
   rendering, based on the stencil buffer, empty pixels for pixels that do not intersect with pixels of the volume rendered image.

7. The method of claim 6 further comprising:
   receiving, by the workstation, the volume rendered image and the graphic rendered image;
   generating, by the workstation, a composite rendered image from the volume rendered image and the graphic rendered image; and
   displaying, by the workstation, the composite rendered image.

8. The method of claim 7 wherein generating the composite rendered image comprises:
   replacing pixels of the volume rendered image with non-empty pixels from the graphic rendered image.

9. The method of claim 7 wherein generating the compositing rendered image comprises:
   comparing the depth buffer entry for each non-empty pixel from the graphic rendered image with the depth buffer entry for each corresponding pixel for the volume rendered image; and
   replacing pixels of the volume rendered image with non-empty pixels from the graphic rendered image with smaller depth buffer values than the corresponding pixels of the volume rendered image.

10. A system for rendering embedded graphics for remote visualization, the system comprising:
    a server configured to:
    render a two-dimensional volume rendered image from three-dimensional data captured for a volume;
    render a two-dimensional graphic rendered image to be embedded in the two-dimensional volume rendered image from three-dimensional data for a graphical object; the two-dimensional graphic rendered image only containing volume rendered pixels covered in the two-dimensional volume rendered image by the graphical object;

compress the volume rendered image and the graphic rendered image;

transmit, over a network, the compressed volume rendered image and the compressed graphic rendered image;

a workstation configured to:

receive, over the network, the compressed volume rendered image and the compressed graphic rendered image;

decompress the compressed volume rendered image and the compressed graphic rendered image;

generate a composite rendered image from the volume rendered image and the graphic rendered image; and display the composite rendered image.

11. The system of claim 10 wherein the volume rendered image and the graphic rendered image comprise graphics hardware frame buffer objects.

12. The system of claim 11 wherein the graphics hardware frame buffer objects for the graphic rendered image comprise graphic image sets, the graphic image sets comprising:

color pixel information of the graphic rendered image;

a depth buffer comprising relative distance information for each pixel of the graphic rendered image; and a stencil buffer comprising identification of which pixels of the graphic rendered image intersect with pixels of the volume rendered image.

13. The system of claim 12 wherein the graphic rendered image comprises:

non-empty pixels for pixels that intersect with pixels of the volume rendered image based on the stencil buffer; and empty pixels for pixels that do not intersect with pixels of the volume rendered image based on the stencil buffer.

14. The system of claim 13 wherein the composite rendered image comprises:

the volume rendered image with pixels replaced by the non-empty pixels from the graphic rendered image.

15. The system of claim 10 wherein the composite rendered image comprises:

the volume rendered image with pixels replaced by non-empty pixels from the graphic rendered image with smaller depth buffer values than the corresponding pixels of the volume rendered image.

16. The system of claim 10 wherein the workstation is further configured to:

receive a request to delete the graphic rendered image; and display, in response to receiving the request, the volume rendered image without the graphic rendered image.

17. A method for rendering high quality embedded graphics for remote visualization, the method comprising:

scanning a patient to capture three-dimensional volume data representing the patient;

rendering a two-dimensional volume rendered image from the three-dimensional volume data representing the patient;

rendering a plurality of two-dimensional graphic rendered images to be embedded in the two-dimensional volume rendered image from three-dimensional data for a plurality of graphics, wherein the plurality of two-dimensional graphic rendered images only contain volume rendered pixels covered in the two-dimensional volume rendered image by the plurality of graphics; wherein the graphics comprise a display point, a line graphic, a curve, a surface, volume shape, or a combination thereof;

generating a composite rendered image from the volume rendered image and the plurality of graphic rendered images; and displaying the composite rendered image.

18. The method of claim 17 wherein rendering the plurality graphic rendered images comprises:

rendering non-empty pixels for pixels that intersect with pixels of the volume rendered image; and rendering empty pixels for pixels that do not intersect with pixels of the volume rendered image.

19. The method of claim 17 wherein generating the composite rendered image comprises:

replacing pixels of the volume rendered image with non-empty pixels from the plurality of graphic rendered images.

20. The method of claim 17 further comprising:

receiving a request to delete one of the plurality of graphic rendered images;

re-generating the composite rendered image from the volume rendered image and the plurality of graphic rendered images, wherein the composite rendered image is re-generated without one of the plurality of graphic rendered images; and displaying the composite rendered image.

* * * * *